United States Patent [19]

Plante

[11] Patent Number: 5,042,727

[45] Date of Patent: Aug. 27, 1991

[54] BUSHWOOD CHOPPER AND SPREADER ATTACHMENT

[76] Inventor: Armand G. Plante, 217, de l'Envoi, B.G.103.3, Dubuisson, Québec, Canada

[21] Appl. No.: 604,648

[22] Filed: Oct. 29, 1990

[51] Int. Cl.⁵ .............................................. B02C 18/00
[52] U.S. Cl. .................................. 241/101.7; 144/2 Z; 144/3 D; 144/162 R; 144/218; 144/370
[58] Field of Search ................... 144/2 Z, 3 D, 162 R, 144/218, 369, 370; 241/101.7, 222, 243; 56/10.1, 255, 320.1

[56] References Cited

U.S. PATENT DOCUMENTS 3,282,310  11/1966  Morenius et al. ................... 144/2 Z
3,576,203   4/1971  Cote .................................... 144/373

Primary Examiner—W. Donald Bray
Attorney, Agent, or Firm—Roland L. Morneau

[57] ABSTRACT

The bushwood chopper of the present invention comprises a frame adapted to be mounted on a crane-type vehicle at the end of a boom. The frame has a structure for supporting a rotatable shaft on which is mounted at least one disc supporting on its periphery, two pivoting cutting blades. The shaft has an abutting ring around its periphery at the level of the cutting blades for preventing the latter from freely rotating 360 degrees. The blades can pivot backwardly upon a sudden resistance to a limit allowing them to hide within the periphery of the disc and to return, as promptly as possible, in their radial operating position. The bushwood chopper, preferably, has a plurality of superposed discs and cutting blades. The lowermost disc is provided with transversal bar in order to chop the stumps remaining below to rotatable cutting blades.

7 Claims, 5 Drawing Sheets

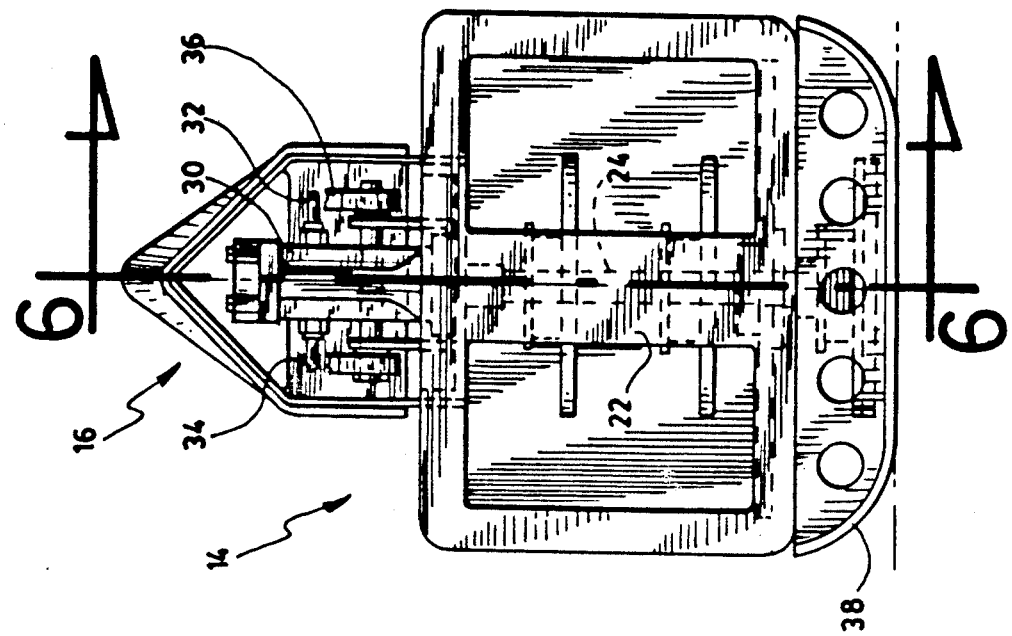
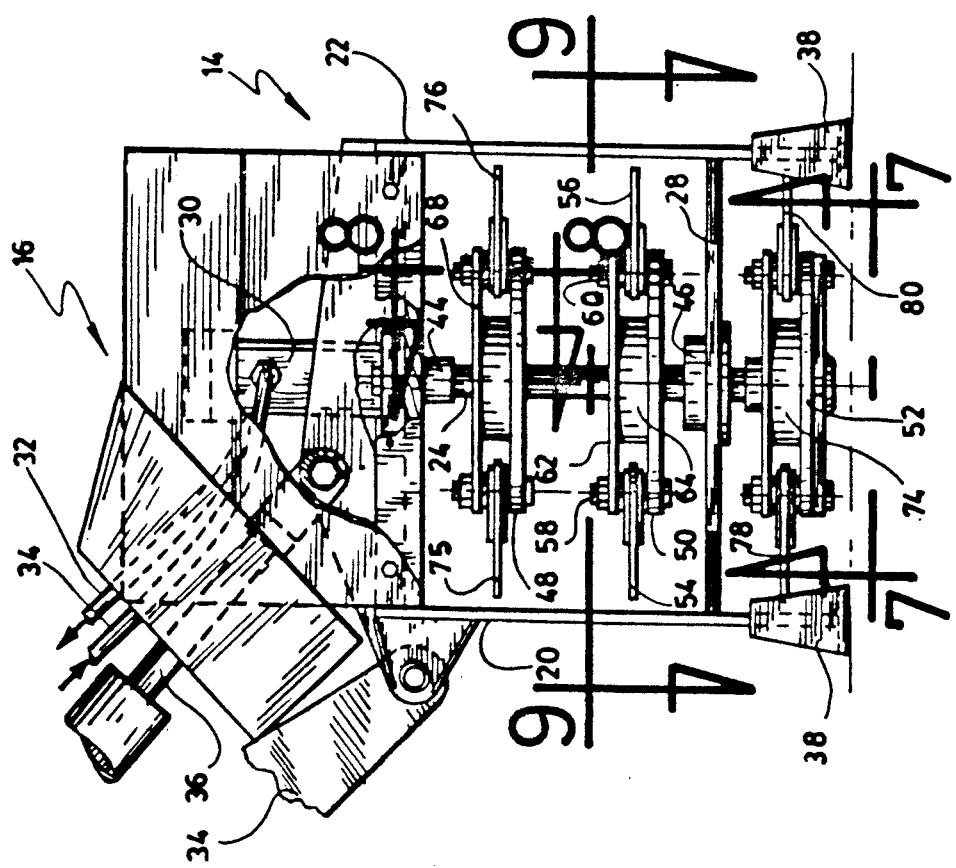

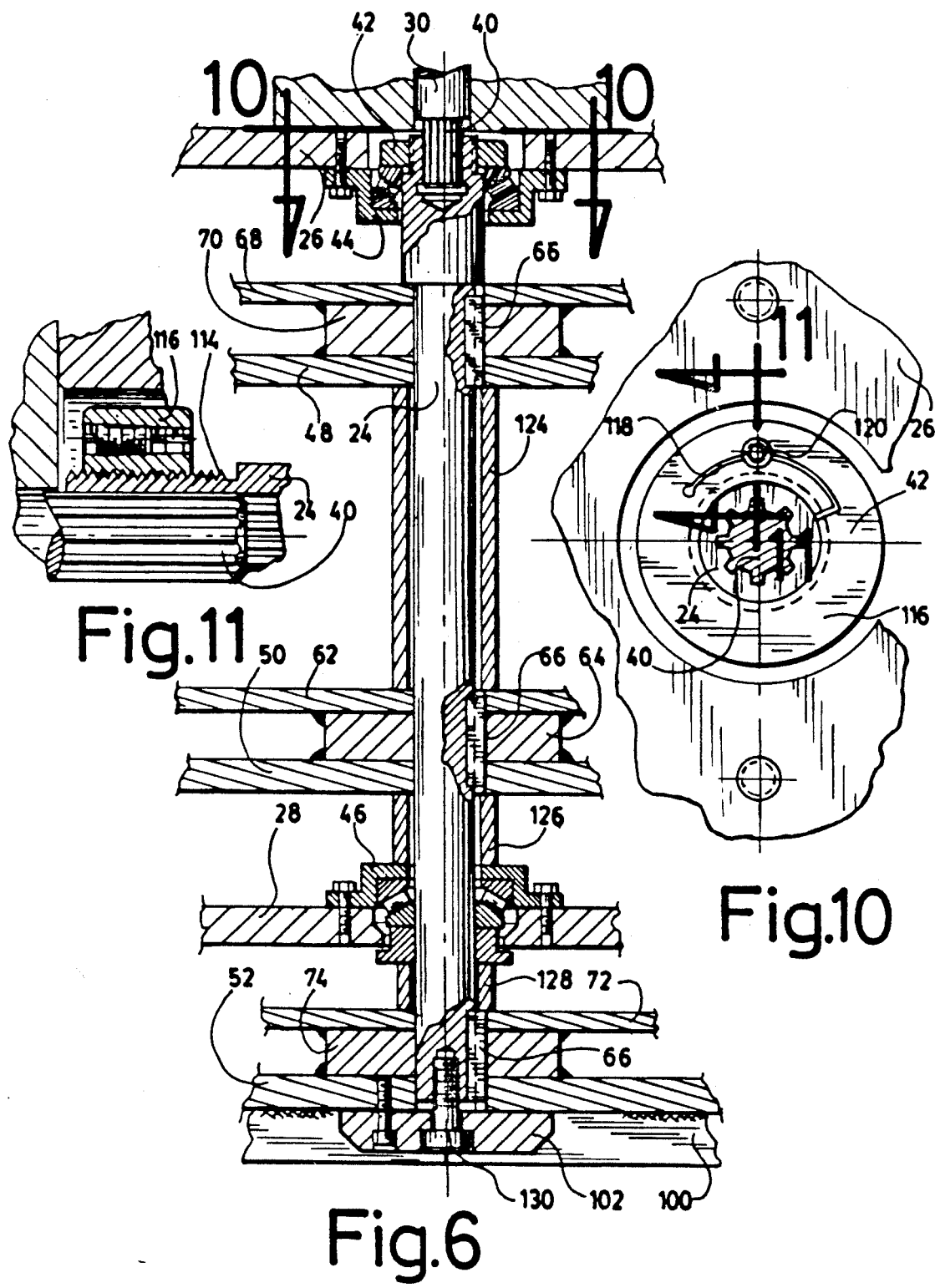

BUSHWOOD CHOPPER AND SPREADER ATTACHMENT

BACKGROUND OF THE INVENTION

1. Field of the Invention

The bushwood chopper and spreader attachment according to the invention is adapted to be carried by a crane-type vehicle having an articulated boom adapted to transmit a rotational movement to a vertical driving shaft of the attachment. The shaft is centrally secured in horizontally superposed metallic discs provided with freely rotating cutters extending at the periphery of the discs. The centrifugal force projects the cutters radially outside the perimeter of the discs but are pivotally pushed inside the periphery upon a sudden encounter of a resisting or unyielding body.

The cutters have a linear speed adapted to spread the chopped residue of trees over a large surface of the surrounding ground in order to regenerate and increase the quality of the earth.

2. Prior Art

U.S. Pat. No. 3,574,989, is directed to a grinder attachable to a tractor. The grinder is designed to rotate about a horizontal axis with cutting knives also provided about horizontal axes. The knives move in a plane perpendicular to their cutting edge and upon obstruction will flip 360° backwards without any stopping means. After this flipping action, the knives return to their operating position with the heel first. This is a waste of cutting time inasmuch as the heel may hit another obstacle before returning to a truly cutting position.

In U.S. Pat. No. 4,509,315, the patentee makes use of pivoting blades makes a full rotation about their axis and have an offset portion to shield the pivotal member.

Boehm discloses, in U.S. Pat. No. 4,218,022, frail knives for combining harvester wherein the cutter edges are pivotally secured to a drum. These knives operate in cooperation with stationary leg portions in order to chop straw.

The demolition mill disclosed in U.S. Pat. No. 3,826,437, makes use of a plurality of free swinging hammers 52 for demolishing material fed into an inlet throat. The hammers are mounted on a plurality of shafts 39 extending between large parallel wheels.

SUMMARY OF THE INVENTION

The bushwood chopper of the present invention comprises a frame adapted to be mounted on a crane-type vehicle at the end of a boom. The frame has a structure for supporting a rotatable shaft on which is mounted at least one disc supporting on its periphery two pivoting cutting blades. The shaft has an abutting ring around its periphery at the level of the cutting blades for preventing the latter from freely rotating through an angle of 360°. The blades can pivot backwardly upon a sudden resistance within an angular limit sufficient to allow them to hide within the periphery of the disc and to return as promptly as possible in their radial operating position.

The bushwood chopper, according to the invention has preferably a plurality of superposed discs and cutting blades. The lowermost disc is provided with transversal bars in order to chop the stumps remaining below the rotatable cutting blades.

BRIEF DESCRIPTION OF THE DRAWINGS

FIG. 4. is an enlarged side view of the chopper shown in FIGS. 1, 2 and 3;

FIG. 5 is a rear view of the chopper shown in FIG. 4;

FIG. 6 is a cross-sectional view of the shaft of the chopper taken along line 6—6 of FIG. 5;

FIG. 10 is a cross-sectional view along line 10—10 of FIG. 6;

FIG. 11 is a cross-sectional view along line 11—11 of FIG. 10;

Figure 1:
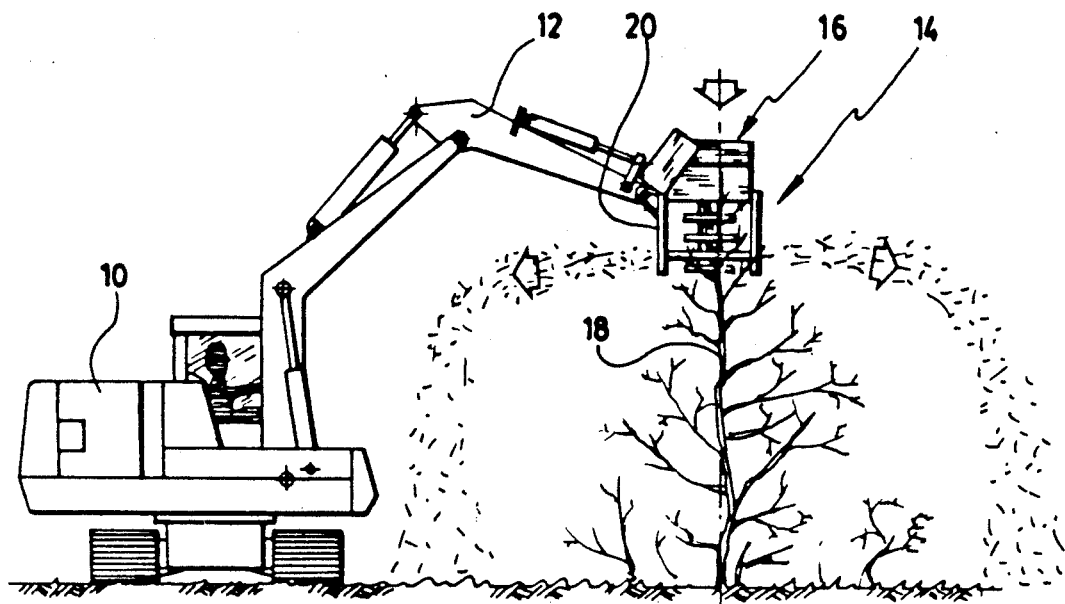
FIGS. 1, 2 and 3 are side views of a bushwood chopper according to the invention mounted on a crane-type vehicle in three different vertical positions of operation.
Figure 2:
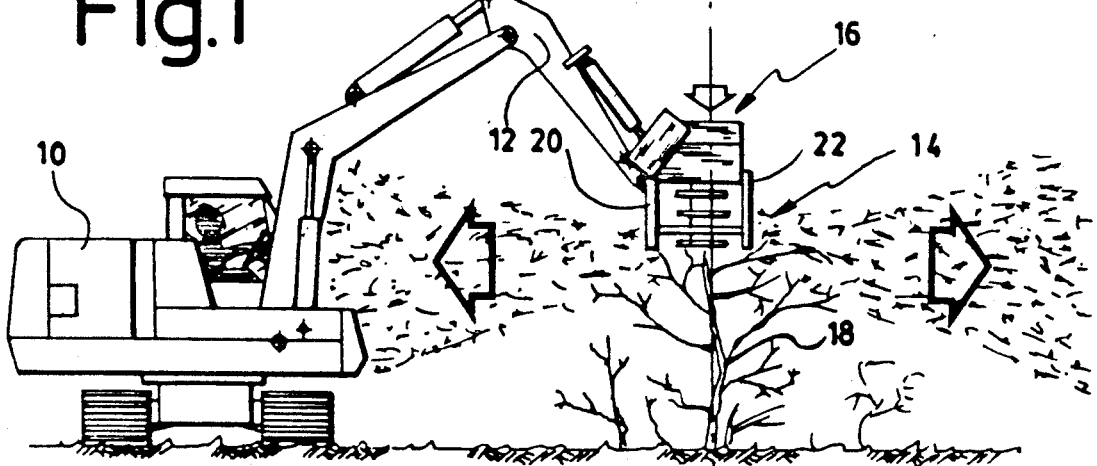
Figure 3:
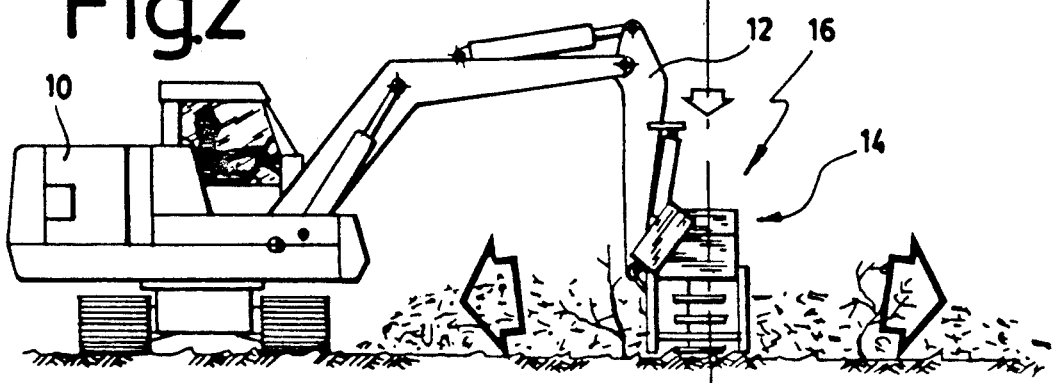

DETAILED DESCRIPTION OF THE INVENTION:

FIGS. 1, 2 and 3 illustrate a cran-type vehicle 10 actuating a boom 12 which supports a bushwood chopper 14 at three different heights. The bushwood chopper 14, according to the invention, is preferably supported by a boom 12 which can swing along an arc whose center is provided by the crane 10. The bushwood chopper 14 starts to operate at the top of the trees or bushes generally illustrated by tree 18. During the chopping operation, the debris are projected mainly sideways considering that the crane and in particular the operator of the crane 10 is protected by a shield plate 20. After each back and forth trip of the chopper 14, the latter is lowered to chop a lower section of the bushes or trees 18 until it reaches the level of the stumps which correspond to practically the total elimination of the bushes or trees. In FIGS. 1, 2 and 3, the debris seem to be projected in the plane of the sheet of paper while it is, in fact, mainly projected in a direction perpendicular to the sheet of paper. The projection of the debris will be more fully explained by referring to FIG. 13.

This chopping operation is needed to maintain free pathways below hydroelectric power lines, or to prepare the ground for reforestation. This is also needed when an industrial zone needs to be developed through a bushed region.

The chopper 14 illustrated in FIGS. 4 and 5 shows a frame having a front shielding panel 20 and a rear shielding panel 22 supporting the hydraulic driving system 16 which is adapted to rotatively drive a shaft 24 laterally supported by an upper transversal plate 26 and a lower transversal plate 28. A hydraulic motor 30 of known types is driving mounted on the upper part of the shaft 24 and is operated by a pair of fluid conduit 32.

The chopper 14 is actuated by a set of linkage levers 34 and 36 to generally maintain the chopper in a vertical position while the boom 12 is raised or lowered, as shown in FIGS. 1, 2 and 3. It is understood, however, that the combination of the boom 12 and linkages 34 and 36 can manipulate the chopper 14 at various inclined positions according to the chopping operation to be performed.

The frame of the chopper which is essentially made of the front and the rear panels 20 and 22 and the transversal plates 26 and 28 is supported by a pair of runners or skating means 38 secured at the lower end of the panels 20 and 22 for allowing the chopper to slide over the ground and keep it from hitting rocks or the like.

The hydraulic motor 30 is connected to the shaft 24 through a combination of spline or trunnion 40 and a hub 42 for transmitting a torque to the shaft 24. The upper plate 26 is connected to the shaft through a roller bearing arrangement 44. Similarly, the lower transversal plate 28 is connected to the shaft 24 through a roller bearing arrangement 46.

As illustrated on FIG. 4 and more specifically in FIG. 6, the shaft 24 supports three discs 48, 50 and 52 each one mounted centrally on the shaft 24. The discs 48, 50 and 52 are preferably made of a solid piece of metal such as steel for the reasons explained later.

Each of the discs has at least two cutting blades pivotally mounted on its periphery. The mounting of the cutting blades will be explained relative to the disc 50, considering that they can be similarly mounted on disc 48 and 52. Cutting blades 54 and 56 are excentrically mounted on axles 58 and 60, respectively on the periphery of the disc 50. The axles 58 and 60 are preferably disposed along the same diameter on the disc 50 in order to balance the weight of the blades and synchronize the repeated cutting action of one cutting blade or cutter after the other. In order to solidify the axle 58 and 60 which will be subject to a centrifugal force by the cutters 54 and 56, a stabilizing plate 62 is mounted above the disc 50 and the two cutters 54 and 56. The stabilizing plate 62 is centrally mounted around the shaft 24 and is fixed at both ends on the axles 58 and 60. Although the plate 62 has been illustrated in FIG. 9 as having a diamond shape, it preferably has a circular shape of the size of the disc 50 so as to provide more inertia to the cutters.

When the shaft 24 is rotated, the disc 50 and stabilizing plate 62 are adapted to be driven in rotation with it. Such a traction may be made by welding directly on the shaft both the disc and the stabilizing plate. However, a more sophisticated arrangement is hereinafter described and illustrated in FIG. 6. An abutment ring 64 is centrally mounted on the shaft 24 between the disc 50 and the plate 62 and is welded to the latter for a synchroneous rotation. The shaft 24 drives the combination of the disc 50, the ring 64 and the plate 62 through a key member 66 longitudinally fixed on the periphery of the shaft. The above-described arrangement between the disc 50, the ring 64 and the plate 62 also applies to the superposed combination of the disc 48 with a corresponding stabilizing plate 68 and an abutment ring 70 as well as to the disc 52 with a stabilizing plate 72 and an abutment ring 74.

When the shaft 24 and the discs 48, 50 and 52 are driven in rotation by the motor 30, the cutting blades 54 and 56 which are pivotally mounted on the axles 58 and 60 are maintained by the centrifugal force outside the periphery of the disc 50. The same applies to cutters 74-76 and 78-80.

Figure 9:
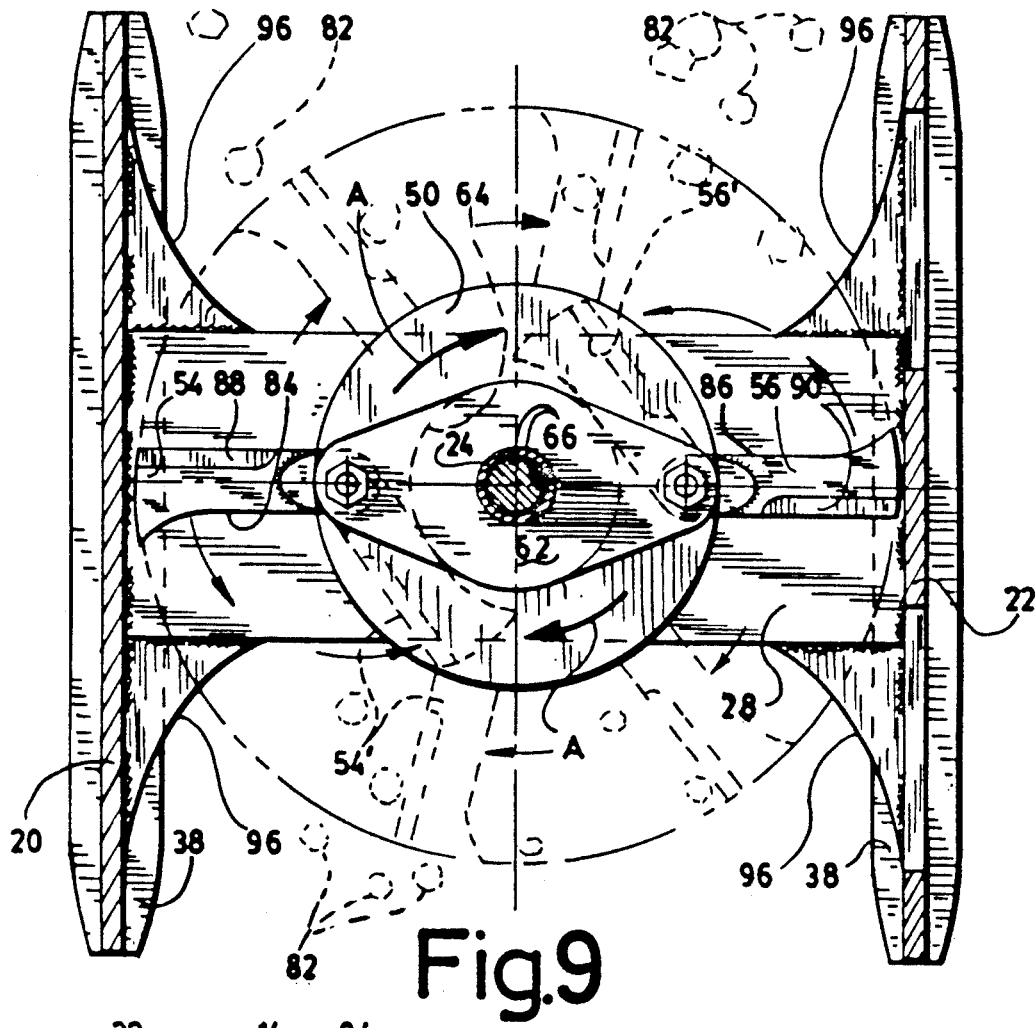
FIG. 9 is a cross-sectional view along line 9—9 of FIG. 4.

The operation of one set of cutting blades 54 and 56 is particularly illustrated in FIG. 9. When the disc 50 rotates in the direction of the arrows A, the cutting blades 54 and 56 maintain their outward radial direction relative to the shaft 24 and the disc 50. When one of the cutting blades hits an object or a tree 82, and such object or tree resists to the normal pathway of the cutting blade, the latter is flipped backwards such as illustrated by blades 54' and 56' in FIG. 9. Each cutter is pivoted backwardly in the direction opposite arrows A until the rear ledge 84 and 86 hits the abutment ring 64 which, in turn, will be projected forwardly to finally return to its original radial position. The abutment ring 64 prevents the cutting blades from making a complete 360° rotation before returning to its original position. Such a complete rotation of the cutting blade constitutes a waste of operating time which reduces the efficiency of the bushwood cutter 14.

In order to absorb as much possible the impact of blades on the ring 64 during the backward flipping of the cutting blades, the rear ledges 84 and 86 are preferably curved in order to have a contacting surface with the abutment ring 64 as large as possible. To meet these conditions, the curve of the rear ledges 84 and 86 has the same curve as the abutment ring 64. Such curves have not been shown to be identical in the drawings so as not to intermingle the lines.

The front edge 88 and 90 of each cutter is preferably sharpened in order to increase the chopping power of the bushwood chopper.

Figure 13:
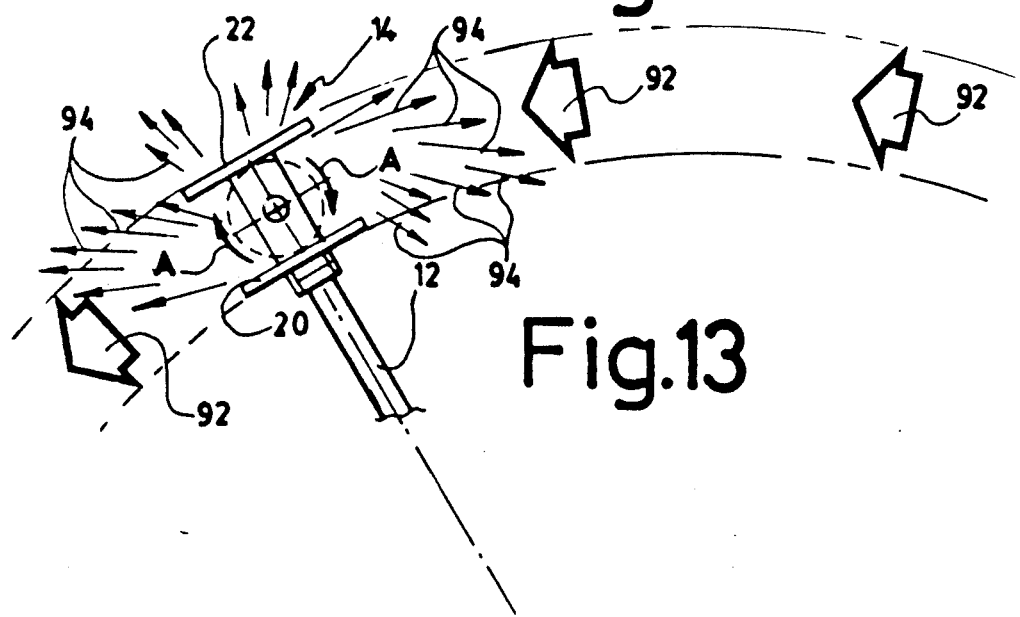
FIG. 13 is a schematic view of a chopper mounted on a portion of a boom during actual operation of the chopper.

The portion of the cutter extending outside the disc 50 is maintained sufficiently long, thick and heavy so as to provide a striking power commensurate with the size of the tree to be chopped. Furthermore, the part of the cutting blades 54 and 56 projecting inside the disc 50 when the blades 54 and 56 are radially extended are made sufficiently short and curved to that this part remains retracted within the periphery of the disc 50 when the cutters 54 and 56 are in their retracted position 54' and 56'. In these conditions, the blades are not damaged when excessive resistance is met by them. As schematically illustrated in FIG. 13, the boom 12 drives the bushwood cutter 14 along an arc illustrated by the arrows 92 whose center is the crane 10. As explained previously, the boom travels back and forth along opposite directions opposite generally identified by arrows 92. After each curved trip, the boom is lowered until it reaches the stumps of the trees or the bushes. The crane is usually not moved during that set of operation. The arrows 94 illustrate the path of projection of the debris of wood produced by the bushwood chopper 14. The direction of the debris illustrated in FIG. 13 helps to clarify the direction of the debris illustrated in FIGS. 1, 2 and 3 considering that the debris are mainly projected sideways due to the front and rear shielding panels 20 and 22. The shielding panel 20 is particularly useful to protect the operator of the crane 10 from being bombarded with short wood logs cut by the chopper. The shielding panel 22 is mainly used as a part of the supporting frame of the chopper and, in particular, for supporting the transversal plates 26 and 28.

As particularly seen in FIG. 9, in order to deflect trees toward the disc 50, which applies also to discs 48 and 52 and their respective cutting blades, deflecting plates 96 are welded between the shielding plates 20 and 22 and the transversal plates 48, 50 and 52. The deflecting plates 96 have a curved extending between the outer edges of the shielding plates 20 and 22 and a portion inside the pathway of the cutting blades 54 and 56.

As explained above, the abutting rings, such as 64 allows the cutting blade to return to their operating position as soon as possible without permitting them to fully rotate 360°. Furthermore, in order to catch and cut as many trees as possible during the travel of the cutting blades 54 and 56, a relative dimension between the cutting blades 54 and 56 and the diameter of the disc 50 is maintained. Such a relative dimension lies somewhere around a ratio of ½ between the active length of a cutter and the diameter of the disc. Under these conditions, the abutting ring 64 has a diameter of about the active length of the blades 54 and 56 in order to flip back within an angle as small as possible from their hiding position under the disc 50. The active length of the cutters extends from the axles 58 and 60 to their outer tip.

In a specific embodiment, with a disc having a diameter of 24 inches, the blades were made to have an active length of 12⅜ inches and the diameter of the abutting ring of 12 inches. The rear ledge 84 and 86 of the blades were made to have a radius of 6 inches in order to provide an abutting surface as wide as possible with the abutting ring. The inertia is also provided with the weight of the rotating elements. For this propose, the discs and the blades are ¾ inch thick and the stabilizing plate was made to have ⅜ of an inch thick although the latter could, for more rugged work, have the same size and thickness as the discs 48, 50 and 52.

Figure 12:
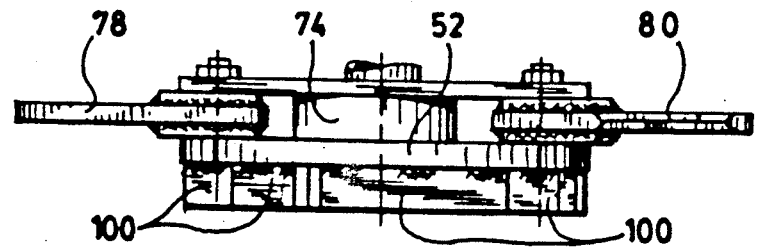
FIG. 12 is an enlarged side view of the lower cutter shown in FIG. 4.
Figure 7:
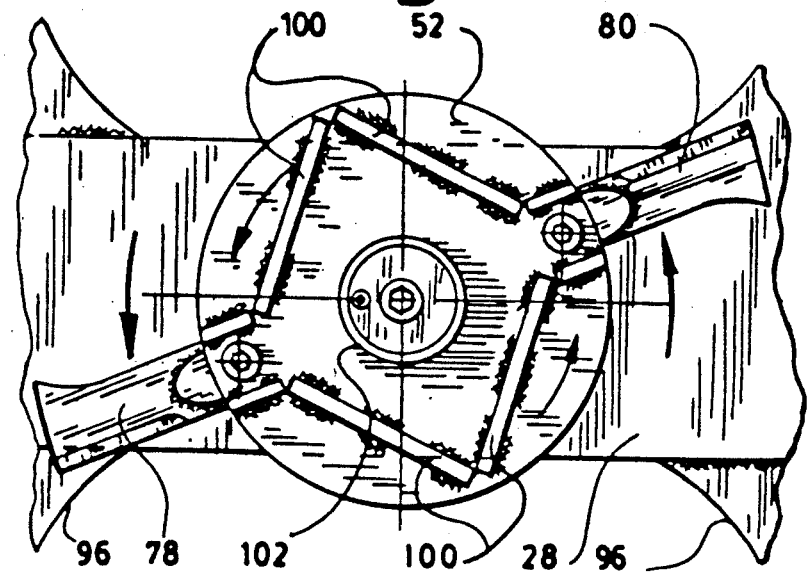
FIG. 7 is a bottom view along line 7—7 of FIG. 4.

The bushwood chopper 14 is mounted on runners 38 to prevent the flying cutting blades from touching the ground and especially from hitting rocks or unintentional objects. However, such a precaution is liable to leave stumps of an undesirable length. For this reason, the lower disc 52 is provided, on its lower surface, as particularly shown in FIGS. 7 and 12, with transversal bars 100. These bars 100 are welded under the plate 52 and extend below the surface of the disc 52 for about a distance of 2 to 3 inches to break the stumps which could not be cut by the lower cutting blades 78 and 80. The transversal bars 100, located on the lower surface of the disc, forcefully hit and slash the stumps when they are disposed in a direction corresponding to cords of the disc adjacent the periphery of the latter. They may also be secured along radial lines. These transversal bars 100 have also the purpose of protecting the bushing 102 extending below the shaft 24 or bolts 104 securing the cutting blades to the disc.

Figure 8:
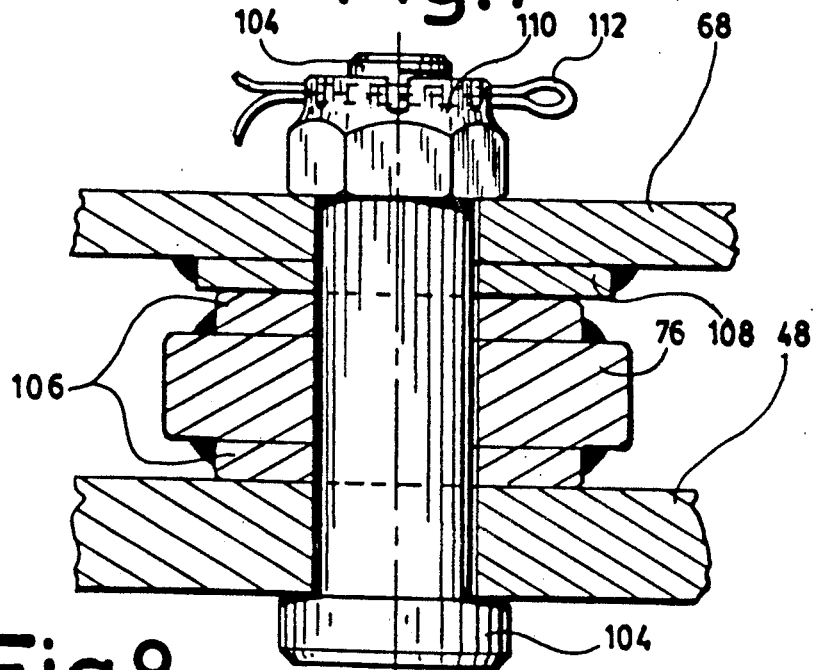
FIG. 8 is a cross-sectional view along line 8—8 of FIG. 4.

As illustrated in FIG. 8, the cutting blades such as blade 76 is mounted between the disc 48 and the plate 68 on a truss bolt 104 with friction rings 106 welded on both sides of the blade 76 and another friction ring 108 welded below the plate 68. The amount of rotation produced between these elements preferably requires that material highly resistant to friction be used to make the friction rings 106 and 108. The bolt 104 is locked with a nut 110 and a split pin 112.

A particular arrangement for locking the spline or trunnian 40 inside the shaft 24, is illustrated in FIGS. 10 and 11. The top end of the shaft is threaded at 114 and is surrounded by a threaded ring 116 to tighten the trunnian 40. The ring 116 is provided with a groove 118 along a portion of an arc through which a tapered screw 120 is adapted to be threaded for widening the slot 118 and tightening the trunnian 40 inside the shaft 24.

The shaft 24 is mounted on the hydraulic motor 30 and is secured, as explained above, by fixing the roller bearing arrangement 44 on the upper transversal plate 26. The assembly of parts is successively made from below. The first set of stabilizing plate 68 and disc 48 is mounted with the corresponding cutting blades 75 and 76. This arrangement is secured to the shaft through a peripheral key member 122. A sleeve 124 is mounted between two sets of cutting blades and another sleeve 126 spaces the disc 50 from the lower transversal plate 28 which is secured to the shaft 24 through the roller bearing arrangement 46. Another sleeve 128 is used to space the lowermost combination of plates 72 and disc 52 mounted on the shaft 24 to which it is secured by the bushing 102 held through the shaft by a bolt 130.

The specific mounting arrangement shown in FIGS. 6, 8, 10 and 11 may be altered without departing from the spirit of the invention.

I claim:

1. A bushwood chopper adapted to be supported and actuated by a crane-type vehicle having an articulated boom and means for transmitting a rotational movement, said chopper comprising:

a frame supportingly surrounding a rotatable vertical shaft, said shaft adapted to be connected at its upper end to said rotational movement transmitting means;

at least one disc centrally secured to said shaft for synchroneously rotating with said shaft;

at least two cutting blades rotatably mounted on the disc on a plane parallel to the disc, said blades being located on axles parallel to said shaft and adjacent the periphery of said disc, said blades having a cutting edge adapted to generally extend radially from said disc, outside the periphery of the disc, each of said axles being diametrically disposed relatively to said disc;

a plate spacedly mounted over said disc and secured to said axles across said shaft for maintaining said axles in parallel relationship with the shaft;

stopper means mounted on said shaft for preventing said cutter blades from backwardly rotating beyond an angle of 180 degrees;

runner means secured to said frame at a level below said blades for maintaining the latter away from the ground;

whereby, the rotation of a combination of said disc, said cutting blades, said plate and said stopper means is adapted to progressively chop bushwood into pieces.

2. A bushwood chopper as recited in claim 1, comprising a plurality of said combination of said discs, said blades, said plates and said stopper means superposedly mounted on said shaft.

3. A bushwood chopper as recited in claim 2, wherein the stopper means is a ring mounted around the shaft and secured to the corresponding disc and plate, and the blades have a rearward ledge adapted to abut against said ring upon sudden pivotal retraction of the blades.

4. A bushwood chopper as recited in claim 2, wherein the lowermost disc has transversal bars secured thereunder, and projecting downwardly therefrom, said bars adapted to slash tree stumps when the chopper is actuated at ground level.

5. A bushwood chopper as recited in claim 3, wherein said frame comprises at least one horizontal guiding plate for deflecting bushwood in the direction of the discs and the cutter blades, said guiding plates having curved ledges generally curving inwardly from the surrounding frame toward the blades.

6. A bushwood chopper as recited in claim 5, wherein the frame comprises a pair of vertical shield plates facing each other and a transversal plates connecting said shield plates, said shaft being mounted on said transversal plates between said shield plates, said guiding plates being laterally secured to said transversal plates and said shield plates, one of said shield plates adapted to be disposed on said chopper in a direction perpendicular to said articulated boom for shielding said vehicle from chopped pieces of bushwood.

7. A bushwood chopper as recited in claim 3, wherein the relative diameter of the ring and width of the blades allow complete retraction of the blade within the periphery of the disc when the blade abuts against the ring.

* * * * *